March 15, 1966

R. LENFANT 3,240,051

DEVICES FOR PRODUCING A MAGNETIC FIELD OF ALTERNATING
INTENSITY, IN PARTICULAR IN APPARATUS FOR MEASURING
THE PERCENTAGE OF PARAMAGNETIC GAS IN
A GASEOUS MIXTURE

Filed July 11, 1963

INVENTOR
RENE LENFANT
BY Corey, Hart & Stemple
ATTORNEY

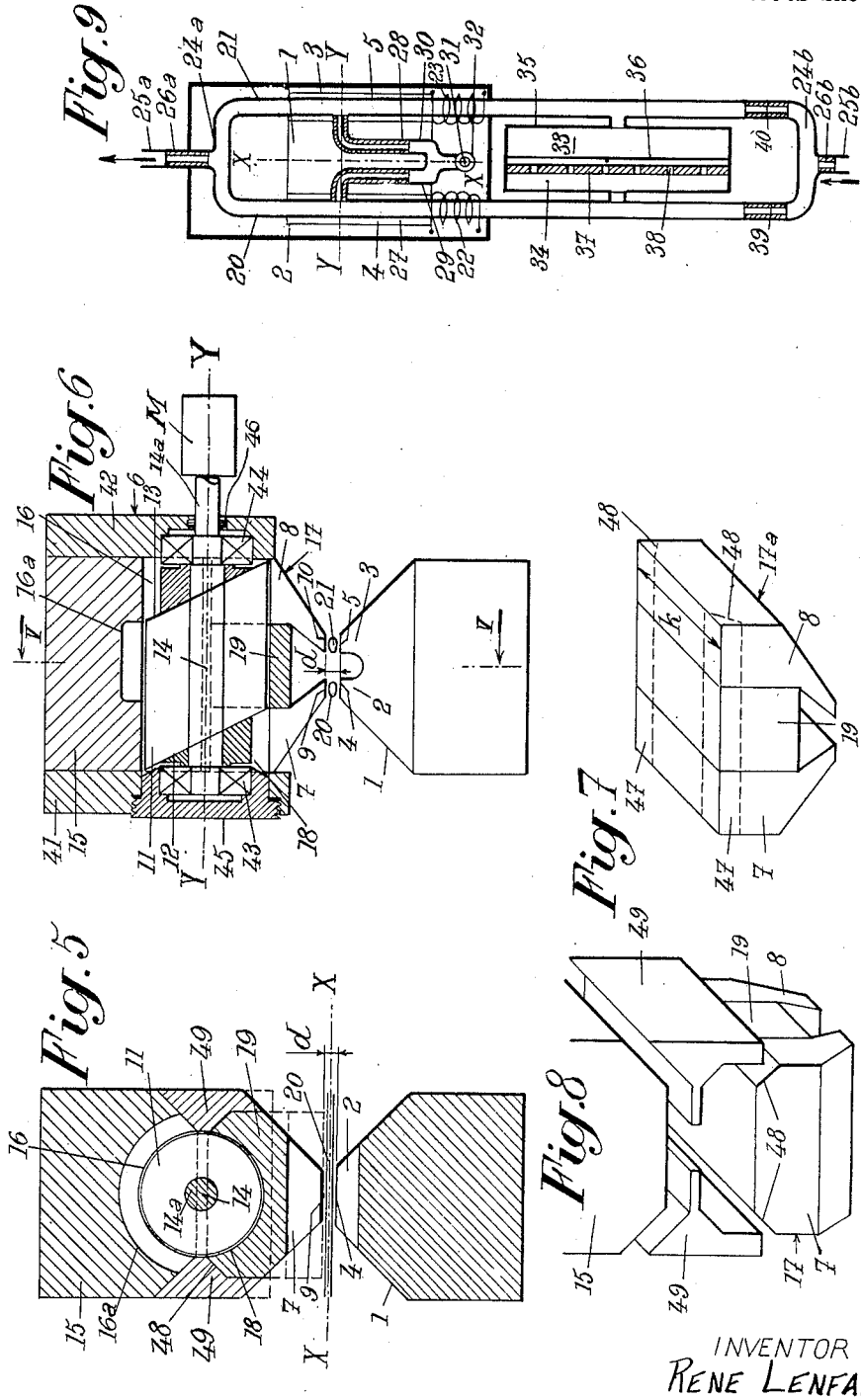

3,240,051
DEVICES FOR PRODUCING A MAGNETIC FIELD OF ALTERNATING INTENSITY, IN PARTICULAR IN APPARATUS FOR MEASURING THE PERCENTAGE OF PARAMAGNETIC GAS IN A GASEOUS MIXTURE
René Lenfant, Paray-Vieille-Poste, France, assignor to Office National d'Etudes et de Recherches Aerospatiales, par abréviation: O.N.E.R.A., Chatillon-sous-Bagneux (Seine), France, a society of France
Filed July 11, 1963, Ser. No. 294,394
Claims priority, application France, July 17, 1962, 904,225, Patent 1,336,252
5 Claims. (Cl. 73—23)

The present invention relates to devices for producing a magnetic field of alternating intensity, in particular in apparatus for measuring the percentage of paramagnetic gas in a gaseous mixture. And it is more particularly concerned with apparatus of this kind intended to measure the percentage, in a gaseous mixture, of oxygen, which is the most common paramagnetic gas.

There are known apparatus for determining the percentage of paramagnetic gas, in particular of oxygen, in a gaseous mixture, such as described with reference to FIGS. 1 and 2 of the U.S. Patent No. 2,696,731, to Karl Luft, issued December 14, 1954, which comprise, in combination, means for creating in a chamber occupied by said gaseous mixture, a magnetic field of an intensity varying as a function of time, means for locally heating a portion of said chamber, i.e. for creating a temperature gradient in said chamber, so as to produce a local modification of the magnetic susceptibility of the paramagnetic gas (which susceptibility decreases when the temperature increases) and means for measuring the pressure variations produced in said chamber portion by the simultaneous effect of the alternating magnetic field and of the temperature gradient.

The above mentioned U.S. patent also discloses, with reference to FIGS. 3 and 4 thereof, apparatus comprising, in combination, means for creating a magnetic field of variable intensity in a volume of space a first portion of which is occupied by a gaseous mixture to be analyzed and a second portion of which is occupied by a sample gas and means for measuring the variable difference between the respective pressures in said volume portions.

The object of the present invention is to provide a device for producing a variable intensity magnetic field which is better adapted to meet the requirements of practice, in particular by giving said intensity a substantially sinusoidal variation as a function of time and making it uniform, at any time, either in the chamber occupied by the gaseous mixture or in the volume portions occupied respectively by the gaseous mixture and by the sample gas, in particular to improve the accuracy and sensitiveness of analyzing apparatus.

The device according to the present invention comprises a first fixed pole unit consisting of a pole piece having at least two separate pole projections of magnetic material, said pole projections having respectively flat, parallel faces extending in a first direction; a second fixed pole unit consisting of two pole pieces of magnetic material; the first of said pole pieces having at one end at least two separate pole projections separated by a member of non-magnetic material, the opposite end of said pole piece having a semi-cylindrical recess therein; said second mentioned pole projections having respectively flat, parallel faces extending in said first direction, disposed opposite said first mentioned faces at a distance therefrom; the second of said last mentioned pole pieces having a semi-cylindrical recess located opposite said first mentioned recess to form therewith a cylindrical housing having an axis parallel to said faces and extending in a direction perpendicular to said first direction, a permanent magnet having its pole adjacent to and cooperating with the pole piece of said first fixed pole unit and the second pole piece of said second fixed pole unit; a cylindrical core of magnetic material having a circular cross section and oblique parallel end faces mounted coaxially for rotation in said housing; the length of said cylindrical core being no greater than the lateral length of one of said second mentioned pole projections plus the non-magnetic separation member; and means for rotating said cylindrical core at a predetermined speed to produce a magnetic field of alternating intensity in the gaps between the faces of the pole projections of the first pole piece of said second fixed pole unit and the faces of the pole projections of said first fixed pole unit, respectively.

Preferred embodiments of the present invention will be hereinafter described with reference to the appended drawings, given merely by way of example, and in which:

FIG. 1 diagrammatically shows, in partial section, a device for producing a magnetic field of alternating intensity made according to the present invention;

FIGS. 3 and 4 are plan views of two kinds of gas circuits adapted to be used with the device according to FIGS. 1 and 2, FIG. 3 showing a circuit with local heating for a single gaseous stream (the stream of gas to be analysed) whereas FIG. 4 shows a circuit for a differential analyzing apparatus including two gaseous streams (the stream of gas to be analysed and a stream of reference gas);

FIGS. 5 and 6 are, respectively, a sectional view on the line V—V of FIG. 6 and an elevational view, partly in section of a preferred embodiment of a device for producing a magnetic field of alternating intensity according to the present invention;

FIGS. 7 and 8 are perspective views showing two successive steps of the manufacture of one of the pole units of the device of FIGS. 5 and 6;

FIG. 9 is a plan view of a gas circuit to be used with the device.

Figure 1:
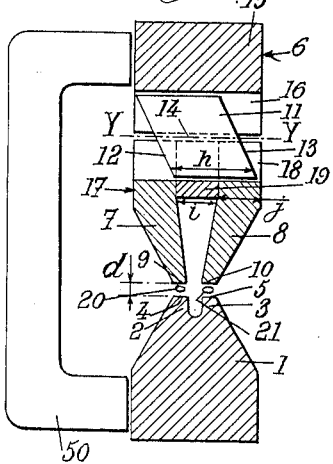

The device for producing a magnetic field of alternating intensity comprises the following elements, as shown by FIGS. 1, 2, 5 and 6.

A first pole unit 1 consisting of a fixed piece having two pole projections 2 and 3 provided with free, flat, parallel faces 4, 5 of elongated shape in a first direction X—X, and A second pole unit 6 comprising two pole projections 7, 8 having free, flat, parallel faces of elongated shape in the same direction X—X, disposed opposite flat faces 4, 5, respectively, at a small distance $d$ therefrom, this pole unit 6 comprising a cylindrical core 11 of circular cross section and having oblique end faces 12 and 13 parallel to each other, this core being rotated at a constant angular speed about its axis 14, which extends in a second direction Y—Y parallel to said faces 4, 5, 9 and 10 and perpendicular to direction X—X, said core 11 being housed in a cylindrical recess one half of which, 16, is formed in a pole mass 15 and the other half, 18, in a structure 17 which comprises pole projections 7 and 8.

The magnetic circuit illustrated by FIG. 1 is as follows: a permanent magnet 50 in the form of letter C extends between pole pieces 1 and 15, made for instance of soft iron, same as core 11 and pole projections 7 and 8. Between the parts forming said projections 7 and 8 there is provided a piece 19 made of a non-magnetic material such as copper. In FIG. 1, magnet 50 is shown on the left of pole masses 1 and 15 for the sake of illustration but in actual practice it should be located behind these pieces.

Between the parallel faces of projections 2, 3 and 7, 8 disposed at a distance $d$ from one another are fitted tubes 20, 21 containing the gaseous mixture to be analyzed and, possibly, the reference gaseous sample.

Figure 2:
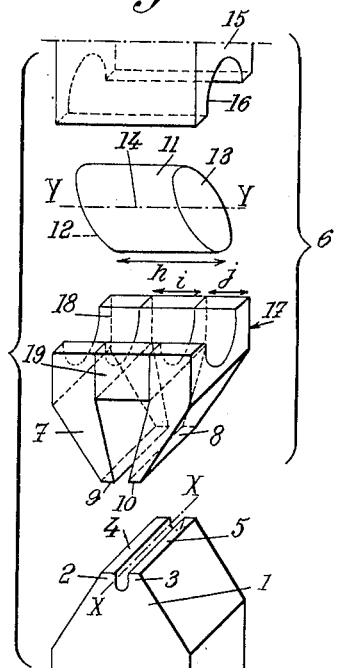
FIG. 2 is a perspective view of the elements of said device, seen separately.
Figure 3:
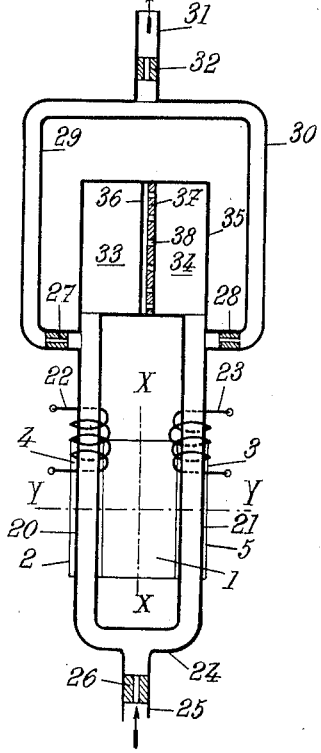

In a first embodiment of this invention, illustrated by FIG. 3, the gas circuit is of the type disclosed in FIGS. 1 and 2 of the above mentioned prior patent and it carries local heating means consisting of windings 22 and 23 surrounding tubes 20 and 21 respectively and through which flows an electric current, said windings, or other equivalent means, being located at one of the ends of the alternating magnetic field produced by each of the pairs of pole projections 2, 7 and 3, 8.

The gaseous masses present in tubes 20 and 21, located in a non uniform magnetic field, are subjected to a force attracting them toward the respective portions of the pole projections where the magnetic field has the maximum intensity. Due to the fact that the magnetic susceptibility of paramagnetic gases decreases when their temperature increases, the relatively cold gases of the lower portion (FIG. 3) of tubes 20 and 21 are more strongly attracted toward the pole projections than the gases heated by windings 22 and 23. This corresponds to a state of unbalance which creates, in the cold portions of tubes 20 and 21, overpressures periodically variable as a function of the magnetic field variation, these overpressures being the higher as the percentage of oxygen (or of any other paramagnetic gas) in the mixture present in each of the tubes is higher.

The gaseous mixture to be analyzed is fed through a tube 25 (containing a capillary duct 26) into a distributing tube 24 communicating with both of the tubes 20 and 21. Said tubes 20 and 21 communicate, at their other ends, through capillary passages 27 and 28, with respective tubes 29 and 30 connected with a common outlet 31 containing a capillary duct 32.

In order to measure the pressure variations in tubes 20 and 21, there is provided a diaphragm capacitor. For this purpose tubes 20 and 21 communicate respectively with the two halves 33 and 34 of a vessel 35, these two halves being separated from each other by a capacitor comprising two elements 36 and 37. Element 36 consists of a diaphragm deformable under the effect of the pressure difference between chambers 33 and 34, whereas element 37 is a fixed wall provided with orifices 38 through which the pressure existing in chamber 34 can act upon diaphragm 36.

Core 11 is rotated about its axis 14 at a uniform speed of revolution, for instance by means of an electric motor. This core rotates between the walls of semi-circular housings 16 and 18. The respective diameters of core 11 on the one hand and said housings on the other hand are adjusted to permit rotation of the core with a minimum play.

Core 11 introduces into the magnetic circuit, between pole pieces 1 and 15, two successive air gaps, one turned toward pole mass 15 and the other turned toward pole structure 17. During rotation, the total sections of these air gaps remain constant and therefore do not produce any modifications of the moment of the core driving torque, which permits of driving said core at a uniform speed.

Modulation of the magnetic field in the gaps between parallel faces 4, 9 and 5, 10 (when core 11 is rotated) is produced by the alternating and periodical variation of the air gap areas between core 11 and each of the projections 7 and 8.

This modulation is transmitted through pole projections 7 and 8 which, in cooperation with pole projections 2 and 3, ensure a concentration of the magnetic field in the gaps between parallel faces 4, 9 and 5, 10 where are tightly housed tubes 20 and 21, preferably of flat shape as illustrated. An intensive magnetic field varying in a substantially sinusoidal fashion, is produced over a portion of each of these tubes 20 and 21, the field being uniform at a given time in each of these tube portions. Of course, member 19, made of non-magnetic material, serves to separate projections 7, 8 magnetically from each other.

In other words, core 11, due to its shape, conveys the magnetic flux alternately through projection 8 (which is magnetized substantially in the position shown by FIG. 1) and through projection 7 (which is magnetized substantially for the position of core 11 at 180° to that illustrated by FIG. 1). The height $h$ of cylindrical core 11 is preferably equal to the sum of the thickness $i$ of insulating piece 19 and of the width $j$ of the pole projections of said core 11.

Due to the substantially sinusoidal variation of the magnetic field intensity in tubes 20 and 21, the phase difference being 180° between these two tubes, the pressure will vary in a sinusoidal manner in each of the respective chambers 33 and 34. It follows that the displacements of diaphragm 36 will be twice those it would undergo if a single tube, 20 or 21, was provided. Capillary elements 27 and 28 serve to prevent the respective pressures in chambers 33 and 34 from becoming instantaneously equal to each other.

The amplitude of the displacement of diaphragm 36, and consequently of the variations of capacity of the capacitor formed by elements 36 and 37, is proportional to the percentage of oxygen (or other paramagnetic gas) in the gaseous stream flowing through tube 25. In the known manner the variations of capacity of this capacitor are transformed into variations of voltage. The sinusoidal voltage thus obtained is amplified, then detected, before acting upon a suitable measurement instrument which may be graduated directly in values of the percentage of oxygen (or other paramagnetic gas) in the gaseous mixture.

The device for creating a magnetic field of variable intensity may also be used in an apparatus of the differential type for measuring the percentage of a paramagnetic gas in a gaseous mixture. Thus the device illustrated by FIGS. 1 and 2 may, instead of cooperating with the gas circuit of FIG. 3, be used in combination with the circuit of FIG. 4, the same reference numerals being used in this case to designate the same parts, respectively.

Figure 4:
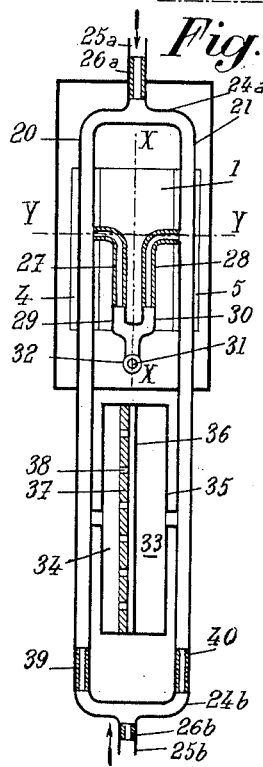

The differential circuit of FIG. 4 is of the type illustrated by FIGS. 3 and 4 of the above mentioned prior patent and it comprises two inlets $25_a$ and $25_b$ for the gaseous mixture to be analyzed and the reference gaseous sample, respectively. These inlets permit of introducing, through U-tubes $24_a$ and $24_b$, into the two ends of tubes 20 and 21, two gaseous streams at respective rates determined by capillary passages $26_a$ on the one hand and $26_b$ on the other hand. As in the embodiment of FIGS. 1 to 3, the active portions of tubes 20 and 21 are disposed in the air gaps between parallel faces 4, 9 and 5, 10 of the device producing the periodically varying magnetic field. The gaseous streams fed through the two ends of tubes 20 and 21 are evacuated simultaneously through capillary elements 27 and 28 into tubes 29 and 30 connected to a common outlet 31 through a capillary passage 32.

Capillary elements 27 and 28 serve the evacuation of gases while maintaining, in tubes 20 and 21, the useful effects of the pressure variations to be measured.

As a matter of fact, when the magnetic field is maximum in one of the air gaps, say air gap 5, 10, and consequently in tube portion 21 housed therein, each of the two gaseous streams tends to move from the end of said tube 21 where the magnetic field is minimum toward the portion of tube 20 housed in the air gap where the field is maximum.

If the respective percentages of oxygen in the two gaseous streams are different, a pressure difference is produced which depends upon the difference of the oxygen percentages and the effect of which is visible for instance at the lower end (on FIG. 6) of tube 21.

In a likewise manner, during the next half-period, when the magnetic field is more intensive in the air gap between parallel faces 4 and 9 than in the air gap between parallel faces 5 and 10, the same phenomenon takes place in tube 20 and there is produced at the lower end of tube 20 a pressure difference depending upon the difference between the respective percentages of paramagnetic gas.

Measurement of the pressure differences is performed as in the embodiment above described by means of a capacitor having two elements (diaphragm 36 and plate 37 provided with holes 38) disposed between the two chambers 33 and 34 of vessel 35, these two chambers 33 and 34 communicating respectively with tubes 20 and 21. Capillary elements 39 and 40 are provided to prevent instantaneous pressure transmission between chambers 33 and 34.

As in the embodiment of FIG. 3, the pressure differences produce variations of the capacities of capacitors 36, 37, which are transformed in a known manner into voltage variations which are amplified, then detected, the amplitude of the rectified current representing the difference between the percentages of paramagnetic gas in the streams fed through inlets $25_a$ and $25_b$, respectively.

A more elaborate embodiment of a paramagnetic gas analyser is illustrated by FIGS. 5, 6 and 9, FIGS. 5 and 6 showing the device which creates the alternating magnetic field, whereas FIG. 9 is a view of a gas circuit which, in combination with the device of FIGS. 5 and 6, permits an analysis either absolute or relative. As for FIGS. 7 and 8 they illustrate two steps of the construction of the device shown by FIGS. 5 and 6.

Concerning first the device for producing the magnetic field, it comprises, as in the diagrammatic embodiment of FIGS. 1 and 2, two pole pieces 1 and 15, a structure 17 comprising two pole projections 7 and 8, with a non magnetic element 19 interposed between them, and a modulating core 11. In FIGS. 5 and 6, magnet 50 has not been shown.

Furthermore, in this embodiment, the magnetic device comprises side plates 41 and 42 made of a non magnetic material such as copper, these side portions enclosing, together with the second pole piece 15 and pole structure 17, the modulating core 11 in a closed space with the provision of two roller bearings 43 and 44 contacting core 11 along oblique surfaces. Gastightness is ensured by a plug 45 screwed inside plate 41.

A stuffing box 46 surrounds, in a fluidtight manner, driving shaft $14_a$, which is driven at constant speed about axis 14 through a synchronous motor M.

In this embodiment of the invention a groove $16_a$ is preferably formed in pole piece 15 in order to reduce and even to eliminate the axial vibrations due to a possible lack of symmetry of core 11 and its axis 14.

In order to make the upper pole unit, I first form a soft iron bar having the cross section of projections 7 and 8 and this bar is cut into elements of the length $k$ (FIG. 7) of said projections. These elements 7 and 8 are secured, for instance by brazing, to a parallelepipedal piece 19 of copper, or another non magnetic material, so as to obtain the unit $17_a$ shown by FIG. 7. The two edges 47 perpendicular to the direction X—X of projections 7 and 8 are cut off along the oblique planes 48.

Distance pieces 49, visible on FIG. 8, are obtained in the same manner as pole projections 7 and 8, that is to say from a bar of suitable cross section, but, in this case, made from a material which is non-magnetic, for instance copper. These elements 49 are secured, for instance by brazing, to unit 17 and to piece 15 to form unit 6, after which the lower end portion of unit 6 is bevelled, as shown by FIG. 5, symmetrically to the upper portion of unit 1 with respect to a horizontal plane, the cylindrical housing 16, 18 being suitably drilled. The circular cylinder with oblique end faces forming core 11 is then fitted in this housing.

Side plates 41 and 42 are suitably fixed to fluidtight unit 6.

The machining of pole piece 1 does not involve any particular difficulty.

As for the gas circuit illustrated by FIG. 9, it is identical to that shown by FIG. 4 (the same reference numerals being used in FIGS. 4 and 9 to designate similar elements) with the exception of the provision, in the circuit of FIG. 9, of heating elements 22 and 23 analogous to the windings 22 and 23 of FIG. 3.

This circuit makes it possible to perform at will either differential measurement or absolute measurement.

In the case of differential measurement, windings 22 and 23 are not heated and consequently the circuit works in the same manner as that shown by FIG. 4, the gaseous mixture to be analysed arriving for instance through tube $25_a$ whereas the sample gas arrives through tube $25_b$.

On the contrary, in order to obtain an absolute measurement, it is necessary to heat windings 22 and 23 so that the conditions in tubes 20 and 21 close to the air gaps between parallel faces 4,9 and 5, 10 are the same as in the embodiment of FIG. 3. The gaseous mixture to be analysed flows in through tube $25_b$ and out through tube $25_a$. Outlet tube 31 is closed by means of a suitable valve. It is also possible to have a parallel feed through $25_a$ and $25_b$, the outflow taking place at 31. The operation is then the same as above stated with reference to FIG. 3. It is also possible to make differential measurement with gases of very different concentrations by causing the gas of higher concentration to enter on the side corresponding to the heated zone. A calibration is of course necessary in accordance with the heating conditions.

Of course, the device for producing a magnetic field as illustrated by FIGS. 5 and 6 might be provided with gas circuit permitting a single type of analysis, for instance with the circuit of FIG. 3 to perform absolute analysis or with the circuit of FIG. 4 for making differential analysis. Such an apparatus consisting of the device of FIGS. 5 and 6 and of a circuit according to either FIGS. 3 or 4 would be less expensive than an apparatus according to FIGS. 5, 6 and 9 but its use would be more restricted.

Inversely the gas circuit of FIG. 9 might be used with the device of FIGS. 1 and 2.

The apparatus according to the present invention permits of producing intensive magnetic fields which are uniform at a given time in given areas.

The variation of this magnetic field as a function of time is substantially sinusoidal.

The uniformity of the magnetic field at a given time permits of ensuring similitude between the measurement effects upon the gaseous molecules contained in one tube and the other, whereas the nearly perfect sinusoidal form of the variation of the magnetic field as a function of time ensures a substantially sinusoidal variation of capacity, which permits a very sensitive measurement and also a good accuracy by the use of an amplifier (for the currents in the measurement circuit comprising capacitor 36, 37) having a narrow band.

Owing to the direction given to the axis of the modulating core, the bearings which support it may be disposed on the outside of the magnetic circuit and symmetrically with respect to said core and to the stresses acting thereon.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A device for producing a magnetic field of alternating intensity which comprises, in combination; a first fixed pole unit consisting of a pole piece having at least two separate pole projections of magnetic material, said pole projections having respectively flat, parallel faces extending in a first direction; a second fixed pole unit consisting of two pole pieces of magnetic material; the first of said pole pieces having at one end at least two separate pole projections separated by a member of non-magnetic material, the opposite end of said pole piece having a semi-cylindrical recess therein; said second mentioned pole projections having respectively flat, parallel faces extending in said first direction, disposed opposite said first mentioned faces at a distance therefrom; the second of said last mentioned pole pieces having a semi-cylindrical reces located opposite said first mentioned recess to form therewith a cylindrical housing having an axis parallel to said faces and extending in a direction perpendicular to said first direction, a permanent magnet having its poles adjacent to and cooperating with the pole piece of said first fixed pole unit and the second pole piece of said second fixed pole unit; a cylindrical core of magnetic material having a circular cross section and oblique parallel end faces mounted coaxially for rotation in said housing; the length of said cylindrical core bieng no greater than the lateral length of one of said second mentioned pole projections plus the non-magnetic separation member; and means for rotating said cylindrical core at a predetermined speed to produce a magentic field of alternating intensity in the gaps between the faces of the pole projections of the first pole piece of said second fixed pole unit and the faces of the pole projections of the first fixed pole unit, respectively.

2. A device according to claim 1, further comprising a gas circuit including two tubes having each a portion thereof, called its active zone, placed between one flat face of the first pole unit and the flat face of the second pole unit located opposite it, means for heating a portion of each of said tubes located close to an end of the active zone thereof, means for feeding a gaseous mixture simultaneously to the respective ends of said tubes located on one side of said active zones thereof, means for evacuating the gaseous mixture simultaneously from the respective ends of said tubes located on the other side of said active zones thereof, and means for indicating the alternating pressure difference between the insides of said tubes, respectively.

3. A device according to claim 1 wherein the length of said cylindrical core is substantially equal to the sum of the thickness of said member of non magnetic material and of the thickness of one of said second mentioned pole projections adjacent said cylindrical core.

4. A device according to claim 1 which further comprises side plates of a non magnetic material perpendicular to the axis of said core and fitting along said pole units to form a closed housing for said core.

5. A device according to claim 1 wherein there is provided a semi-cylindrical groove in the semi-cylindrical recess of the second pole piece of said second fixed pole unit.

References Cited by the Examiner

UNITED STATES PATENTS

| | | | |
|---|---|---|---|
| 2,625,584 | 1/1953 | Kells et al. | 73—26 |
| 2,696,731 | 12/1954 | Luft | 73—23 |
| 3,100,852 | 8/1963 | Peek et al. | 310—191 |

RICHARD C. QUEISSER, *Primary Examiner.*

J. FISHER, *Assistant Examiner.*